United States Patent [19]

Rowe et al.

[11] 4,108,002
[45] Aug. 22, 1978

[54] DISPOSABLE THERMOMETER

[76] Inventors: Charles L. Rowe, 787 E. Illinois Rd., Lake Forest, Ill. 60045; Ronald A. Lewis, 1085 Barnard Dr., Buffalo Grove, Ill. 60090

[21] Appl. No.: 751,474

[22] Filed: Dec. 16, 1976

[51] Int. Cl.² ............................ G01K 5/08; G01K 5/22
[52] U.S. Cl. ..................................... 73/371; 128/2 H; 73/374
[58] Field of Search ........................ 73/371, 372, 374; 128/2 H

[56] References Cited

U.S. PATENT DOCUMENTS

| | | | |
|---|---|---|---|
| 2,651,203 | 9/1953 | Lamb | 73/374 |
| 2,712,237 | 7/1955 | Margolis | 73/371 |
| 3,490,287 | 1/1970 | Coben | 73/371 |
| 3,812,719 | 5/1974 | Shopsky | 73/368 |
| 3,913,402 | 10/1975 | Doyle | 73/374 X |

*Primary Examiner*—S. Clement Swisher
*Assistant Examiner*—Denis E. Corr

[57] ABSTRACT

A disposable throwaway thermometer formed of synthetic resin having a gas impervious layer effectively maintaining a preselected vacuum condition within the completed thermometer. The impervious layer may be provided as a glass core tube defining the capillary bore of the thermometer. The glass layer may have a thickness of substantially less than that of the synthetic resin layer. One end of the glass core tube may be provided with a bulb element defining the reservoir chamber of the thermometer. The other end of the glass core tube may be sealingly closed as by fusion. The composite glass core and synthetic resin jacket may be formed by molding of the synthetic resin is situ about the glass core. The reservoir bulb may be sealingly secured to one end of the glass core tube.

17 Claims, 3 Drawing Figures

DISPOSABLE THERMOMETER

BACKGROUND OF THE INVENTION

1. Field of the Invention

This invention relates to thermometers and in particular to disposable, or throwaway, thermometers.

2. Description of the Prior Art

The conventional clinical thermometer comprises a glass tube defining at one end a reservoir bulb and having an axial capillary bore which is conventionally closed at the end opposite the reservoir bulb. The indicator liquid is sealed within the glass element and a suitable scale is provided on the outer surface thereof for indicating a temperature corresponding to the level of the miniscus of the indicator liquid expanded into the capillary bore. To provide an accurate reading, the capillary bore is effectively evacuated to provide a preselected vacuum condition which is effectively maintained over the life of the thermometer by the gas impervious characteristics of the glass.

A serious problem, however, has arisen relative to the use of such thermometers in clinical applications relative to the possibility of cross infection which occurs when the thermometer is reused. The cost of such glass thermometers is such that they cannot be considered as throwaway, one-time use thermometers, and thus there has been a strong need for a low cost substitute for such glass thermometers in applications, such as clinical applications.

One apparently obvious solution to this vexatious problem attempted by numerous investigators in this field has been to use a synthetic resin substitute for the glass material. As is well known, synthetic resin material may be molded at low cost in large quantities and, thus, the synthetic resins would appear at first blush to offer an almost obvious solution to this problem. Thus, it has been that a large number of different types of synthetic resin thermometers have been developed. Plastic molding techniques are sufficiently accurate to provide extremely accurate capillary bore dimensions and prototypes of such synthetic resin thermometers have, when produced, shown original conformation to the stringent requirements of such clinical thermometer applications.

However, such synthetic resin thermometers have proven completely unacceptable as a substitute for such glass thermometers. More specifically, it has been found that while such synthetic resin thermometers may be formed to have the required accuracy for such clinical use, after a relatively short period of time, such as several weeks, the thermometers lose their accuracy and are completely unacceptable for such clinical use. It has been found that the cause of this loss of accuracy resides in the inability of known synthetic resins to prevent gaseous diffusion therethrough so that the original vacuum condition within the thermometer cannot be maintained over a period of time.

One novel solution to this problem has been recently developed. Thus, it has been proposed to eliminate the vacuum condition within the capillary bore by providing a small access opening at the distal end of the capillary bore through the plastic element so that the indicator liquid within the thermometer is always at atmospheric pressure. Thus, it is immaterial whether or not diffusion occurs through the plastic material. This novel approach to the problem is exemplified in the following U.S. Pat. Nos. 3,739,642 and 3,938,388 of Josef F. Klingler.

However, the open-ended thermometer solution has one defect in that the indicator liquid is exposed to atmospheric contaminants at all times. Absorption of such contaminants, such as water vapor, contaminant gases, etc., may alter the effective volume and other characteristics of the indicator liquid so that some effect on the accuracy of such thermometers may occur from such causes in normal storage and use. Thus, while the open-ended thermometer may provide one solution to the disposable thermometer problem, there still remains a strong need for a simple sealed thermometer which, in substantially all respects, is similar to the conventional glass thermometer but yet is formed of a low cost synthetic resin material permitting the thermometer to be a one-time use, throwaway thermometer.

SUMMARY OF THE INVENTION

The present invention comprehends an improved synthetic resin, throwaway thermometer which solves the problems of the above discussed synthetic resin thermometers in a novel and simple manner.

More specifically, the present invention comprehends providing such a throwaway thermometer which comprises essentially a molded plastic thermometer, but which utilizes a layer of glass, or other gaseous impervious material, in association with the synthetic resin portion thereof so as to effectively prevent gaseous diffusion into the capillary bore and thereby maintain a preselected vacuum condition therein.

In the illustrated embodiment, the glass layer comprises a glass core tube having an axial bore defining the capillary bore of the thermometer. The wall thickness of the glass core tube may be relatively small with the synthetic resin jacket surrounding the glass core tube having a substantially greater wall thickness. Illustratively, the glass core tube may comprise conventional glass tubing having a wall thickness of approximately 0.02 inch. The wall thickness of the glass core tube is preselected to effectively prevent gaseous diffusion therethrough into the axial bore thereof so that a vacuum condition applied to the bore may be effectively maintained, thereby permitting the thermometer to be a substantial equivalent of the conventional glass thermometers, while yet being capable of being formed at such low cost as to permit the thermometer to be considered as a throwaway, one-time use device.

In the illustrated embodiment, the plastic jacket is formed in situ about the glass core tube. The ends of the core tube may be allowed to project outwardly from the plastic jacket so that the reservoir bulb may be sealingly associated with one end thereof and the other end may be sealingly closed subsequent to the filling of the thermometer with suitable indicator liquid in the conventional manner. By closing the other end of the glass core tube and sealing the reservoir bulb to the first end thereof, the diffusion characteristics of the synthetic resin material have no bearing on the maintained vacuum condition and, thus, may be chosen suitably for other characteristics, such as low cost, ready moldability, compatibility of thermal expansion characteristics relative to glass, etc.

The thermometer and method of forming such a thermometer of the present invention are extremely simple and economical while yet providing the highly desirable features discussed above and solving a vexatious problem which has eluded those skilled in the art for a long period of time notwithstanding the great and continuing interest in providing such a throwaway thermometer construction.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
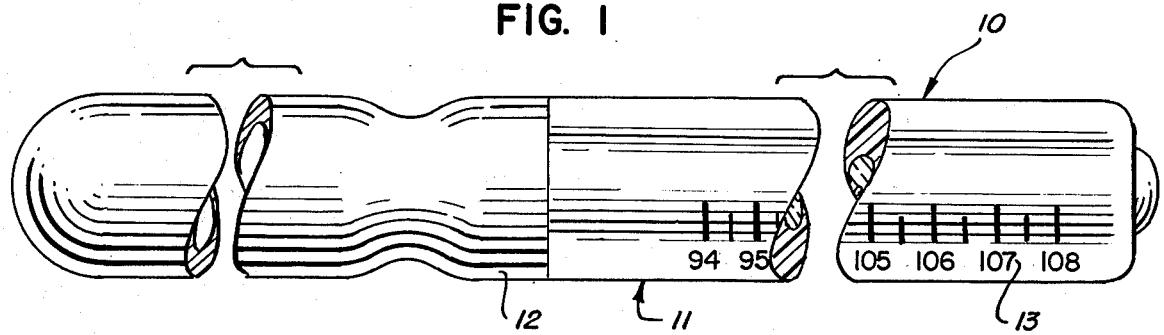
FIG. 1 is a broken side elevation of a thermometer embodying the invention.

In the exemplary embodiment of the invention as disclosed in the drawing, a thermometer generally designated 10 is shown to comprise a low cost throwaway thermometer having a composite capillary tube portion 11, a reservoir bulb 12, and an indicator scale portion 13. The capillary element portion 11 comprises a composite formed of a synthetic resin portion 14 and an inner glass core tube 15. The core tube defines an axial capillary bore 16. The bore has an accurate, effectively maintained preselected diameter throughout its length.

The core tube 15 may comprise a conventional glass tube such as used for pipette purposes and may be formed of conventional soda lime glass. Illustratively, the glass may have a coefficient of thermal expansion of $93 \times 10^{-7}/C°$ from 0° to 300° C. The glass may be cut to the desired size from elongated stock.

Figure 2:
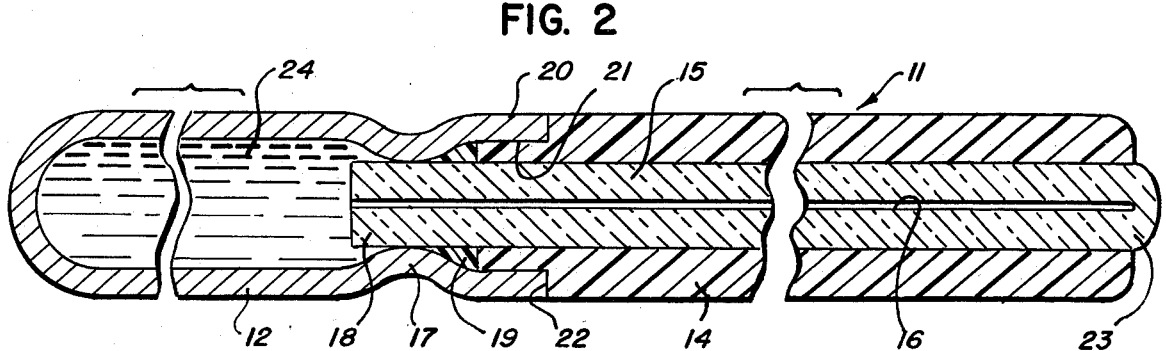
FIG. 2 is a diametric section thereof.

As shown in FIG. 2 of the drawing, reservoir bulb 12 may comprise a cup-shaped bulb element having a portion 17 engaging one end 18 of the core tube. Portion 17 may be suitably constricted to have sealing engagement with core tube end 18. Sealing means 19 may be provided for sealing the reservoir bulb to the core tube end as desired and, illustratively, may comprise a suitable epoxy resin which concurrently may effectively define bonding means for locking the reservoir bulb to the core tube end 18. To provide improved strength in the connection of the reservoir bulb to the capillary portion 11 of the thermometer, the bulb may be provided with a distal end portion 20 fitted to one end 21 of the synthetic resin portion 14 of the capillary element. In the illustrated embodiment, portion 21 defines an annular recess 22 for receiving the bulb end 20 flush with the remainder of the capillary portion 14.

Capillary bulb 12 may be formed of any suitable nonpermeable material, such as glass, metal, etc. In the illustrated embodiment, the bulb is formed of stainless steel.

The synthetic resin jacket 14 may be formed of any suitable light-transmitting resin. In the illustrated embodiment, the jacket may be formed of a polypropylene resin, such as that provided by Hercules, Inc., of Wilmington, Delaware, under the trademark PRO-FAX #6523. Such polypropylene material is approved for hospital use and provides desirable stiffness, resistance to solvents and chemicals, and facilitated molding. The resin may be clear, or may be suitably colored as desired by the use of conventional color additives. Thus, the thermometers may be readily color-coded for different applications as desired.

As further shown in FIG. 2, the distal end 23 of the core tube 15 may be fused closed in completing the manufacture of the thermometer. Thus, as the indicator liquid 24 within the thermometer is disposed within the nonpermeable reservoir bulb 12 and nonpermeable glass core tube, a vacuum condition existing within the capillary bore 16 is effectively maintained whereby the thermometer 10 has maintained accuracy permitting its use as a clinical thermometer, etc.

Figure 3:
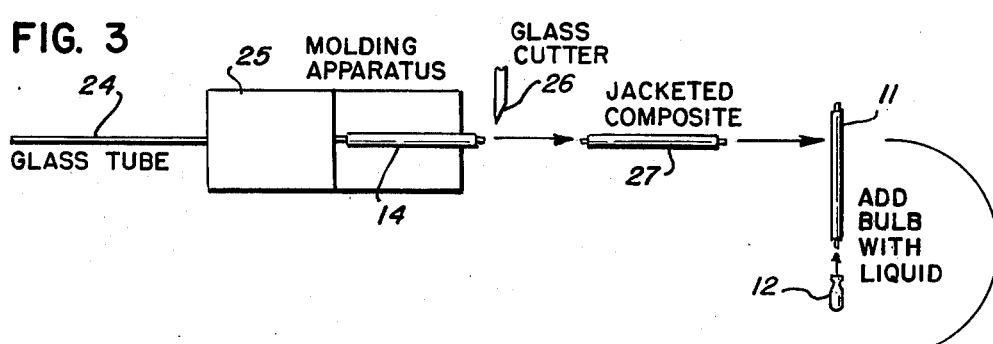
FIG. 3 is a schematic block diagram illustrating the method of forming the thermometer.
Figure 3:
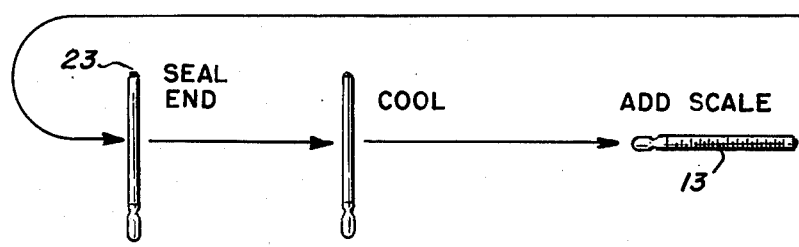

One method of forming the improved thermometer 10 is illustrated in FIG. 3. As shown therein, the core tube may be provided from a continuous supply 24 with the jacket 14 being molded at spaced intervals along the tube by a conventional molding apparatus 25. After leaving the molding apparatus, the individual jacketed composites ae separated by cutting of the core tube portion by a suitable glass cutter, such as cutter 26. Thus, as shown in FIG. 3, the core tube may project outwardly at opposite ends from the jacket. Reservoir bulb 12 may be mounted to one end of the jacketed composite with suitable adhesive bonding material 19 provided within the recess 22 prior to the mounting of the bulb thereto. The bulb is preferably filled with the indicator fluid before insertion of the end 18 of the glass core tube thereinto with the excess fluid from the reservoir space 28 within the bulb 12 being forced outwardly through the capillary tube 16 so as to completely fill the bulb 12 and capillary bore 16. This operation is conducted preferably at a somewhat elevated temperature, i.e., above the highest temperature to be indicated by the thermometer which, in the illustrated embodiment of the clinical thermometer, is 108° F. End 23 of the glass core tube is then sealed at the elevated temperature as by fusion of the glass to close the distal end of the capillary bore. Upon cooling of the thermometer, a vacuum condition is automatically produced within the capillary bore above the column of indicator liquid therein, which vacuum condition, as discussed above, is maintained effectively throughout the useful life of the thermometer as a result of the nonpermeable containment of the indicator liquid by elements 12 and 15.

A suitable scale 13 may then be applied as by conventional methods for accurately indicating the desired temperature range of the thermometer. In the illustrated embodiment, the coefficients of expansion of the glass material of core tube 15 and synthetic resin material of jacket 14 are generally similar. If desired, suitable additives may be provided in the synthetic resin material to alter the coefficient of expansion thereof as desired.

The resultant thermometer 10 is extremely simple and economical of construction and thus may be considered to be a disposable thermometer. The use of low cost, commercially available pipette material for the glass core tube and the facilitated molding in situ of the plastic jacket permits the thermometer to be formed at a cost only slightly higher than that of the prior art thermometers wherein the entire capillary element was formed of molded plastic but which, as discussed above, proved completely unsatisfactory in failing to maintain the desired vacuum condition therein. Thus, the thermometer of the present invention solves a long felt need in providing a low cost throwaway thermometer which functions and appears substantially similar to the conventional glass thermometer.

The foregoing disclosure of specific embodiments is illustrative of the broad inventive concepts comprehended by the invention.

We claim:

1. A throwaway thermometer comprising: an elongated element formed of a molded synthetic resin and having an axial bore; a layer of glass in said bore for effectively precluding gaseous diffusion into said bore and defining an inner capillary bore; means at one end of said element defining a reservoir communicating with one end of said capillary bore; temperature indicating scale means associated with said element; means sealingly closing the other end of said capillary bore at the other end of the element, said layer of glass being outwardly exposed at said other end of the element; and an indicator liquid in said reservoir and capillary bore under a preselected effectively maintained vacuum pressure.

2. The throwaway thermometer of claim 1 wherein said reservoir means comprises a bulb sealingly connected to said glass layer.

3. The throwaway thermometer of claim 1 wherein said reservoir means comprises a bulb formed of metal.

4. The throwaway thermometer of claim 1 wherein said reservoir means comprises a bulb formed of glass.

5. The throwaway thermometer of claim 1 wherein said reservoir means comprises an adhesively sealingly bonded bulb.

6. A throwaway thermometer comprising: a composite element defined by a molded synthetic resin tubular portion and a tubular glass portion coaxially within said synthetic resin portion and having a wall thickness less than that of said synthetic resin portion for effectively precluding gaseous diffusion therethrough, said composite defining an axial capillary bore, one end portion of said glass portion being outwardly exposed at one end of said element; means at the other end of said element defining a reservoir communicating with one end of said capillary bore; temperature indicating scale means on said element; means sealingly closing the other end of said capillary bore at said exposed one end of the glass portion of the element; and an indicator liquid in said reservoir and capillary bore under a preselected effectively maintained vacuum pressure.

7. The throwaway thermometer of claim 6 wherein said exposed one end portion of said glass portion projects outwardly from said synthetic resin portion.

8. The throwaway thermometer of claim 6 wherein said means closing said other end of said capillary bore is formed of glass.

9. The throwaway thermometer of claim 6 wherein each end of said glass portion projects outwardly from said synthetic resin portion.

10. The throwaway thermometer of claim 6 wherein the other end portion of said glass portion defines one end of the capillary bore and projects outwardly from said synthetic resin portion into said reservoir bulb.

11. The throwaway thermometer of claim 6 wherein the other end of said glass portion defines one end of the capillary bore and projects outwardly from said synthetic resin portion, said reservoir bulb being sealingly connected thereto.

12. The throwaway thermometer of claim 6 wherein said one end of said glass portion is fused.

13. The throwaway thermometer of claim 6 wherein said synthetic resin portion comprises a molded-in-place jacket.

14. The throwaway thermometer of claim 6 wherein said glass portion has a wall thickness of approximately 0.02 inch.

15. The throwaway thermometer of claim 6 wherein said synthetic resin portion is molded about said glass portion.

16. The throwaway thermometer of claim 6 wherein said reservoir bulb is secured to said synthetic resin portion.

17. The throwaway thermometer of claim 6 wherein said synthetic resin portion is colored.

* * * * *